US011143544B2

(12) United States Patent
Ren et al.

(10) Patent No.: US 11,143,544 B2
(45) Date of Patent: Oct. 12, 2021

(54) MOVABLE CONTAINER, ASSOCIATED ELECTRONIC DEVICE AND ASSOCIATED METHOD

(71) Applicant: LINGDONG TECHNOLOGY (BEIJING) CO. LTD, Beijing (CN)

(72) Inventors: Guorong Ren, Beijing (CN); Ou Qi, Beijing (CN); Zhaoqiang Chen, Beijing (CN); Ruizhi Li, Beijing (CN)

(73) Assignee: LINGDONG TECHNOLOGY (BEIJING) CO. LTD., Beijing (CN)

( * ) Notice: Subject to any disclaimer, the term of this patent is extended or adjusted under 35 U.S.C. 154(b) by 0 days.

(21) Appl. No.: 16/053,566

(22) Filed: Aug. 2, 2018

(65) Prior Publication Data

US 2019/0113382 A1 Apr. 18, 2019

(30) Foreign Application Priority Data

Oct. 12, 2017 (CN) .......................... 201710947917.6

(51) Int. Cl.
*H04N 7/18* (2006.01)
*G01G 19/52* (2006.01)
(Continued)

(52) U.S. Cl.
CPC .............. *G01G 19/52* (2013.01); *A45C 5/03* (2013.01); *A45C 5/14* (2013.01); *G01G 9/00* (2013.01);
(Continued)

(58) Field of Classification Search
CPC .......... G01G 19/52; G01G 19/58; G01G 9/00; G01G 23/18; A45C 5/03; A45C 5/14;
(Continued)

(56) References Cited

U.S. PATENT DOCUMENTS 5,106,141 A * 4/1992 Mostashari ............... B60P 3/14
108/116
7,039,519 B2 5/2006 Ishiguro et al.
(Continued)

FOREIGN PATENT DOCUMENTS

| CN | 105657115 A | 6/2016 |
| CN | 105814416 A | 7/2016 |

(Continued)

OTHER PUBLICATIONS

Masayuki et al, Electric Lift and Cargo Handling Vehicle, Machine English translation of the JP2017048040A1 (Year: 2017).*

(Continued)

*Primary Examiner* — Shan E Elahi
(74) *Attorney, Agent, or Firm* — WPAT, P.C.; Anthony King

(57) ABSTRACT

A movable container includes: a driving mechanism, a sensing device, and a control circuit. The driving mechanism is arranged to provide a momentum to the movable container. The sensing device is arranged to sense a motion feature in accordance with the momentum provided by the driving mechanism. The control circuit is coupled to the sensing device and the driving mechanism and arranged to calculate a calculated mass of the movable container in accordance with the motion feature sensed by the sensing device. The control circuit is coordinated with the driving mechanism and the sensing device via a user input. In some embodiments, the movable container is a suitcase or a luggage.

8 Claims, 13 Drawing Sheets

(51) Int. Cl.
- *G01G 19/58* (2006.01)
- *A45C 5/03* (2006.01)
- *A45C 5/14* (2006.01)
- *G01G 9/00* (2006.01)
- *G01G 23/18* (2006.01)
- *G06T 7/20* (2017.01)

(52) U.S. Cl.
CPC ............ *G01G 19/58* (2013.01); *G01G 23/18* (2013.01); *G06T 7/20* (2013.01); *A45C 2005/148* (2013.01)

(58) Field of Classification Search
CPC . A45C 2005/148; A45C 5/045; A45C 13/001; A45C 15/00; G06T 7/20; G01D 5/244; G01P 3/66; G01P 15/00
USPC .......................................................... 348/142
See application file for complete search history.

(56) References Cited

U.S. PATENT DOCUMENTS

| | | | | |
|---|---|---|---|---|
| 9,524,600 | B2* | 12/2016 | Yong | E05B 65/0092 |
| 9,770,084 | B1* | 9/2017 | Shiekh | A45C 15/00 |
| 2004/0065518 | A1* | 4/2004 | Hoberman | A45C 13/385 190/107 |
| 2005/0010356 | A1 | 1/2005 | Ishiguro et al. | |
| 2006/0032687 | A1* | 2/2006 | Park | A45C 5/14 180/65.1 |
| 2007/0107947 | A1* | 5/2007 | Truong | A45C 13/28 177/131 |
| 2010/0018088 | A1* | 1/2010 | Rajpal | A45C 15/00 40/5 |
| 2010/0219730 | A1* | 9/2010 | Watts | F25D 25/025 312/404 |
| 2011/0046775 | A1* | 2/2011 | Bailey | B07C 3/02 700/224 |
| 2012/0098642 | A1* | 4/2012 | Krawczewicz | G06K 19/07707 340/10.1 |
| 2012/0186926 | A1* | 7/2012 | Sheikh | A45C 5/03 190/115 |
| 2012/0247897 | A1* | 10/2012 | Sheikh | A45C 13/262 190/115 |
| 2012/0255824 | A1* | 10/2012 | Schnell | A45C 13/385 190/18 A |
| 2014/0107868 | A1* | 4/2014 | DiGiacomcantonio | A45C 5/14 701/2 |
| 2014/0151173 | A1* | 6/2014 | Reh | A45C 13/42 190/18 A |
| 2014/0277841 | A1* | 9/2014 | Klicpera | A45C 13/385 701/2 |
| 2015/0292936 | A1* | 10/2015 | Sheikh | G01G 19/58 190/115 |
| 2015/0348347 | A1 | 12/2015 | Diz et al. | |
| 2016/0286912 | A1* | 10/2016 | Morszeck | B32B 3/30 |
| 2017/0074002 | A1* | 3/2017 | Cooper | E05B 65/523 |
| 2017/0220040 | A1* | 8/2017 | London | A45C 5/145 |
| 2017/0274530 | A1* | 9/2017 | Mottram | B25J 9/1633 |
| 2017/0290401 | A1* | 10/2017 | Bhatnagar | A45C 13/262 |
| 2017/0343409 | A1* | 11/2017 | Natarajan | A45C 13/001 |
| 2018/0325230 | A1* | 11/2018 | Morszeck | A45C 13/005 |

FOREIGN PATENT DOCUMENTS

| | | | | |
|---|---|---|---|---|
| CN | 107028611 | A | 8/2017 | |
| CN | 107830922 | | 3/2018 | |
| CN | 108720211 | A | 11/2018 | |
| JP | 2017048040 | A * | 3/2017 | ............ B66F 66/924 |
| JP | 2017510808 | A | 4/2017 | |
| KR | 20120019664 | A | 3/2012 | |
| KR | 101350240 | B1 | 1/2014 | |
| KR | 101663933 | B1 | 10/2016 | |
| WO | 2012046177 | A1 | 4/2012 | |
| WO | WO-2014073971 | A * | 5/2014 | ............ A45C 15/00 |
| WO | WO-2014073971 | A1 * | 5/2014 | ............ A45C 9/00 |

OTHER PUBLICATIONS

Masayuki et al, Electric Lift and Cargo Handling Vehicle, Machine English translation of the JP2017048040A (Year: 2017).*
First Office Action issued from CNIPA of China for corresponding application 201810870593.5 dated Mar. 12, 2019.
Second Office Action issued from CNIPA of China for corresponding application 201810870593.5 dated Dec. 16, 2019.
Third Office Action issued from CNIPA for corresponding application 201810870593.5 dated Apr. 15, 2020.
International Search Report, Cited References and Written Opinion dated Mar. 6, 2019 issued by the Patent Cooperation Treaty for the PCT Counterpart Application No. PCT/CN2018/14562.
English Abstract of CN108720211A.
English Abstract of CN105814416A.
English Abstract of JP2017510808A.
English Abstract of KR101663933B1.
English Abstract of KR20120019664A.
English Abstract of KR101350240B1.
English Abstract of CN107028611A.

* cited by examiner

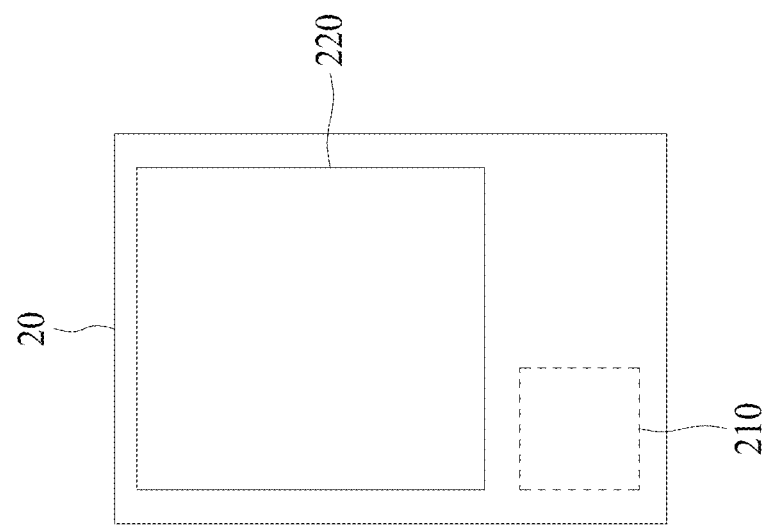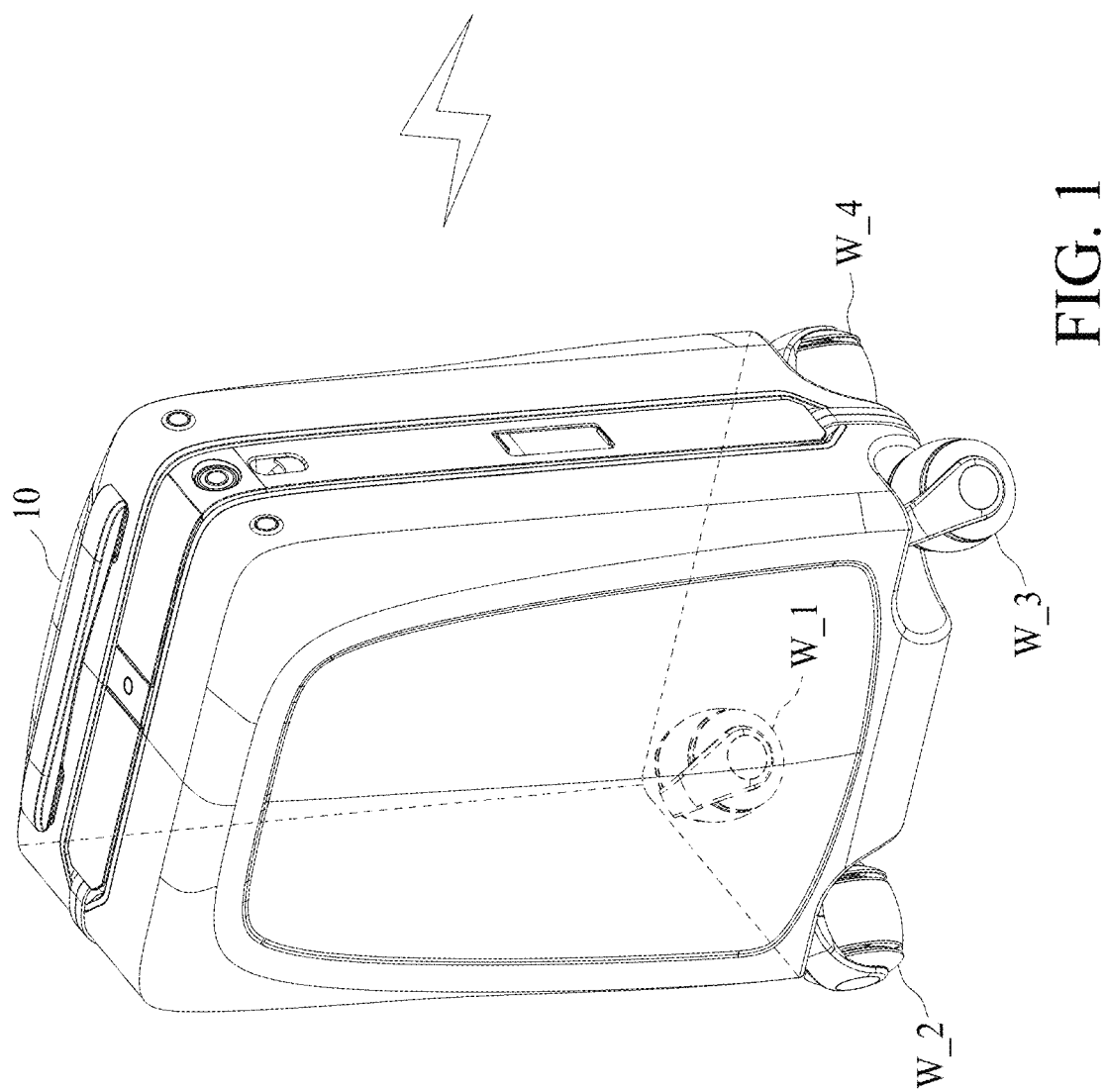
FIG. 1

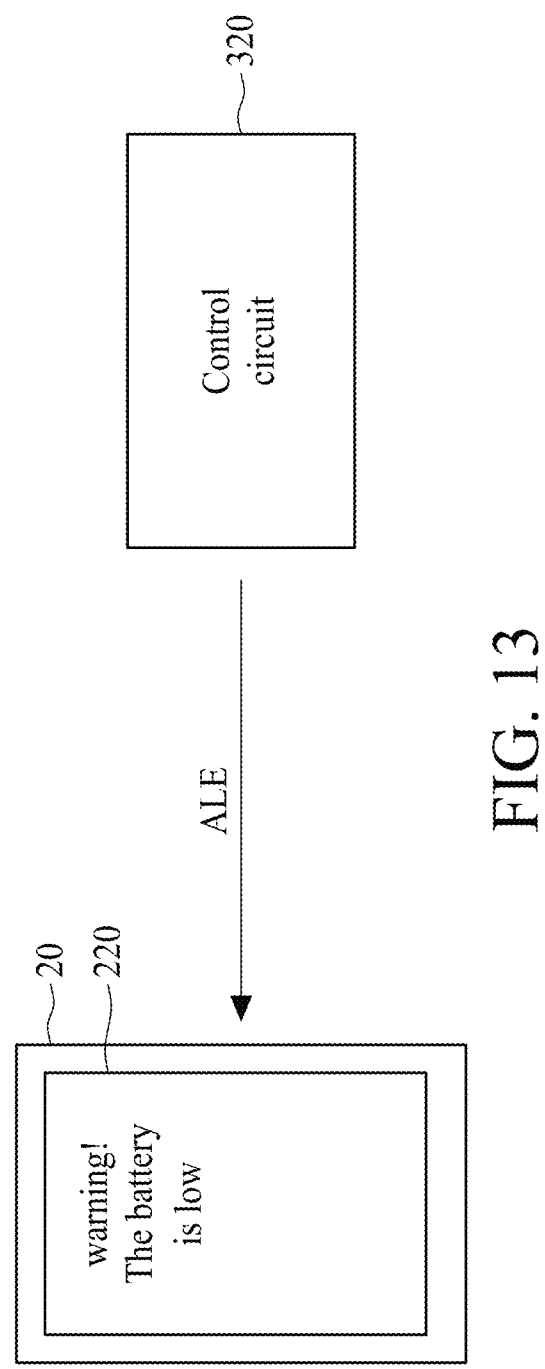

MOVABLE CONTAINER, ASSOCIATED ELECTRONIC DEVICE AND ASSOCIATED METHOD

BACKGROUND

Traditionally, when a user needs to weigh a suitcase or other piece of luggage, a scale is required. Such scale, however, is not always accurate and easy to acquire, which might cause an inconvenient user experience. Therefore, a new device is desired.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1 is a diagram illustrating a movable container and an electronic device connected thereto according to an embodiment of the present disclosure.

FIG. 13 is a diagram illustrating a control signal provided to the user comprising an alert message according to another embodiment of the present disclosure.

DETAILED DESCRIPTION

Figure 2:
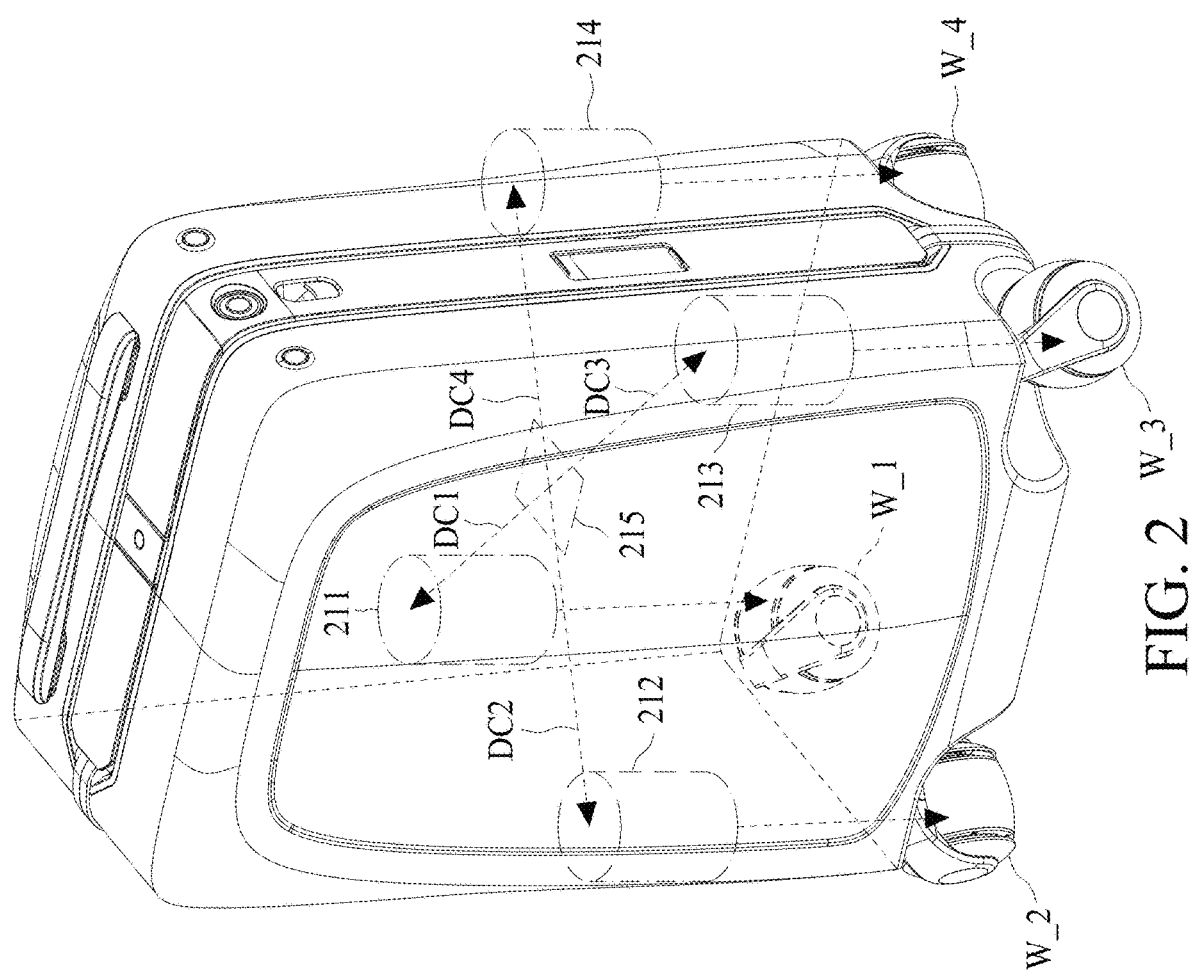
FIG. 2 is a diagram illustrating circuits installed in the movable container according to an embodiment of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

The embodiments of the present disclosure propose a movable container, an associated electronic device connected thereto and an associated method applied thereby to solve the aforementioned problems. In some embodiments, the movable container may be, but is not limited to, a suitcase. Any other container which can move manually or automatically shall fall within the scope of the present disclosure.

FIG. 1 is a diagram illustrating a movable container 10 and an electronic device 20 electronically connected thereto according to an embodiment of the present disclosure. It should be noted that the electronic device 20 may be a portable electronic device such as a mobile phone, a laptop or a personal digital assistant (PDS), or a non-portable electronic device such as a desktop computer, a server, or a computer terminal, which is not a limitation. In addition, the electronic device 20 may connect to the movable container 10 wirelessly, in a wired arrangement, or directly. For example, the electronic device 20 may be a mobile phone, and may connect to the movable container 10 via a wireless communication method such as Bluetooth or Wi-Fi. For another example, the electronic device 20 may be a laptop, and may connect to the movable container 10 via any kind of transmission line such as a Universal Serial Bus (USB) line, or a High Definition Multimedia Interface (HDMI). For yet another example, the electronic device 20 may be directly embedded in the movable container 10.

As shown in FIG. 1, the movable container 10 includes wheels W_1 to W_4 for facilitating the motion of the movable container 10 toward any direction. It should be noted that the number of wheels, size of wheels and the location of wheels installed on the movable container 10 shown in FIG. 1 are only for illustrative purpose, and do not comprise a limitation of the present invention. Similarly, the tool for the motion of the movable container 10 is not limited to wheels as shown in FIG. 1. In other embodiments, the movable container 10 may include a belt or roller, or any kind of tool for facilitating the motion of the movable container 10. The movable container 10 may include more elements than those shown in FIG. 1. For example, a handle may be included for carrying the movable container 10. However, only those elements pertinent to the present disclosure are illustrated in FIG. 1 for brevity.

As shown in FIG. 1, the electronic device 20 includes a transceiver circuit 210 and a user interface 220, wherein the transceiver circuit 210 is arranged to transmit and receive signals from the movable container 10, and the user interface 220 is arranged to interact with a user of the electronic device 20 according to a user input issued by the user for communicating with the movable container 10 or via signals received from the movable container 10. For example, but not limited to, the user interface 220 may include a touch display screen. The user input is issued by the user by touching the screen, and the signals received from the movable container 10 are displayed on the screen for notifying the user. It should be noted that the size and the location of the transceiver circuit 210 and the user interface 220 shown in FIG. 1 are only for illustrative purpose.

FIG. 2 is a diagram illustrating a driving mechanism of the movable container 10 according to an embodiment of the present disclosure. The driving mechanism is arranged to provide a momentum to the movable container 10, wherein the driving mechanism includes wheels W_1 to W_4, motors 211 to 214, and a battery 215. Each of the motors 211 to 214 corresponds to one of the wheels W_1 to W_4. In some embodiments, each motor is a hub motor included within the corresponding wheel. The battery 215 is arranged to provide driving currents DC1 to DC4 to each of the motors 211 to 214, respectively, to drive the motors. When the motors 211 to 214 receive the driving currents DC1 to DC4, the motors 211 to 214 provide the momentum by cooperating with the corresponding wheels. It should be noted that the connection between the battery 215 and each of the motors 211 to 214, and the connection between the motors 211 to 214 and the corresponding wheels W_1 to W_4, are not a limitation of the present disclosure. In other words, the driving currents DC1 to DC4 may be provided to the motors 211 to 214 through a variety of ways, and the motors 211 to 214 may coordinate with the corresponding wheels through different ways. For example, the driving current might be provided to the motor with a cable, and the motor might coordinate with the corresponding wheel through gears or a belt. In some embodiments, the battery 215 is detachable. In an example, when the user needs to check in the movable container 10 at an airport, the battery 215 installed in the movable container 10 can be removed. In some embodiments, the battery 215 is rechargeable. It should be noted that the size, the locations, the number and the type of the motors and the battery are not a limitation of the present disclosure.

Figure 3:
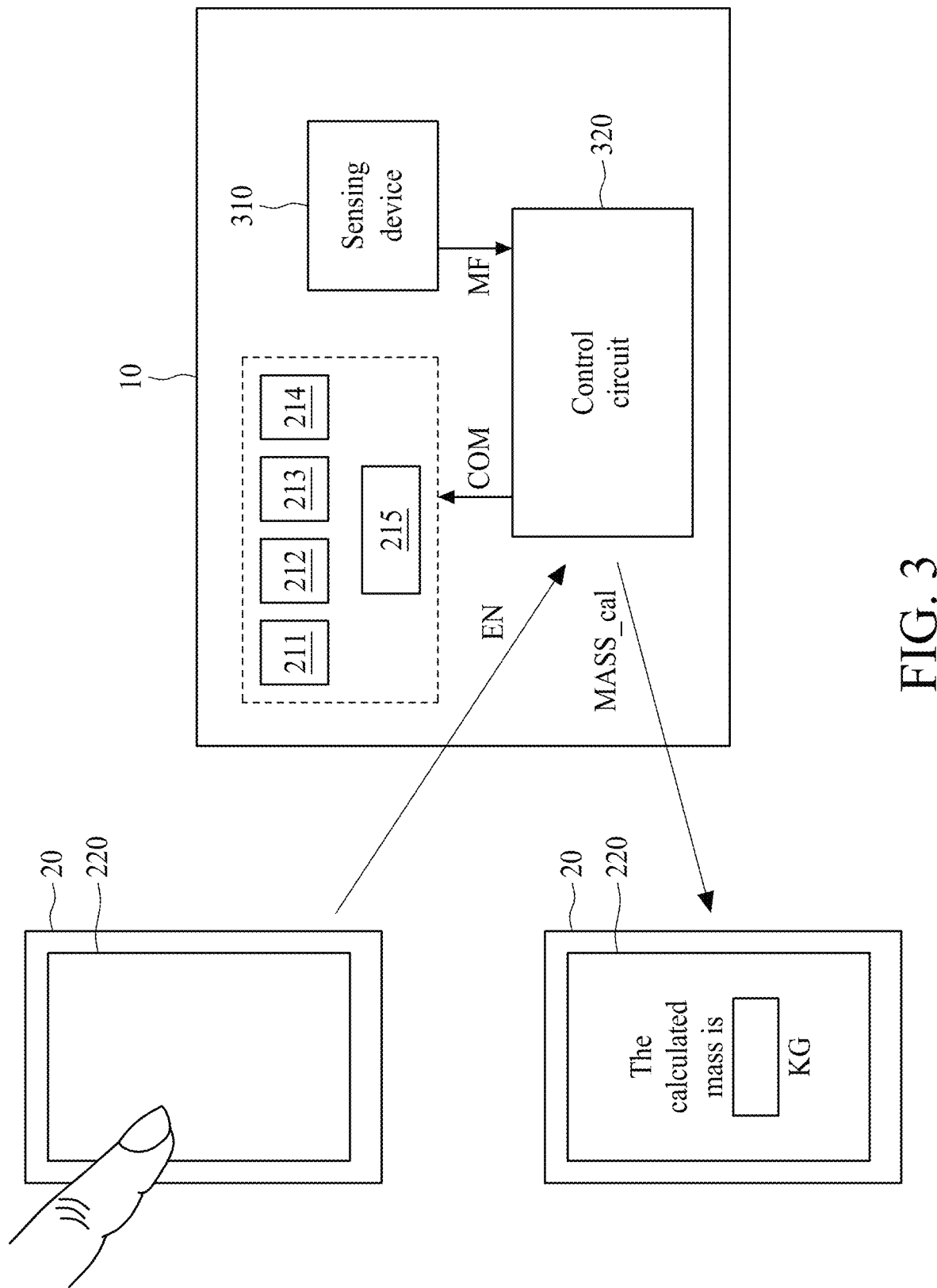
FIG. 3 is a diagram illustrating a driving mechanism according to an embodiment of the present disclosure.

FIG. 3 is a diagram illustrating a sensing device 310 and a control circuit 320 coupled to the driving mechanism including the motors 211 to 214 and the battery 215 of the movable container 10 according to an embodiment of the present disclosure. The control circuit 320 is arranged to receive an enable signal EN converted from the user input via the transceiver circuit 210 to activate a calculation operation, wherein the calculation operation is arranged to calculate a calculated mass MASS_cal of the movable container 10. The control circuit 320 is further arranged to issue a command COM to the driving mechanism the battery 215 or a control unit in the driving mechanism not shown in FIG. 2). When the command COM is received by the driving mechanism, the momentum is provided to the movable container 10. The sensing device 310 is arranged to sense a motion feature MF of the movable container 10 while the momentum is being provided. In some embodiments, the motion feature MF may be acceleration, velocity, a moving distance, or a length of time of the movable container 10 being moved. The control circuit 320 calculates the calculated mass MASS_cal of the movable container 10 according to the motion feature MF provided by the sensing device 310, and transmits the calculated mass MASS_cal via the user interface 220 to inform the user. For example, the calculated mass MASS_cal is displayed on a screen of the user interface 220 to inform the user. It should be noted that the connection between the control circuit 320 and the driving mechanism (i.e., the battery 215 or the control unit in the driving mechanism) and the connection between the control circuit 320 and the sensing device 310 are not limited by the above embodiment. For example, the connections may be implemented by a wireless method such as Bluetooth, Wi-Fi, or through a cable. The detailed description of calculating the calculated mass MASS_cal according to the motion feature MF will be discussed in the following paragraphs.

Figure 4:
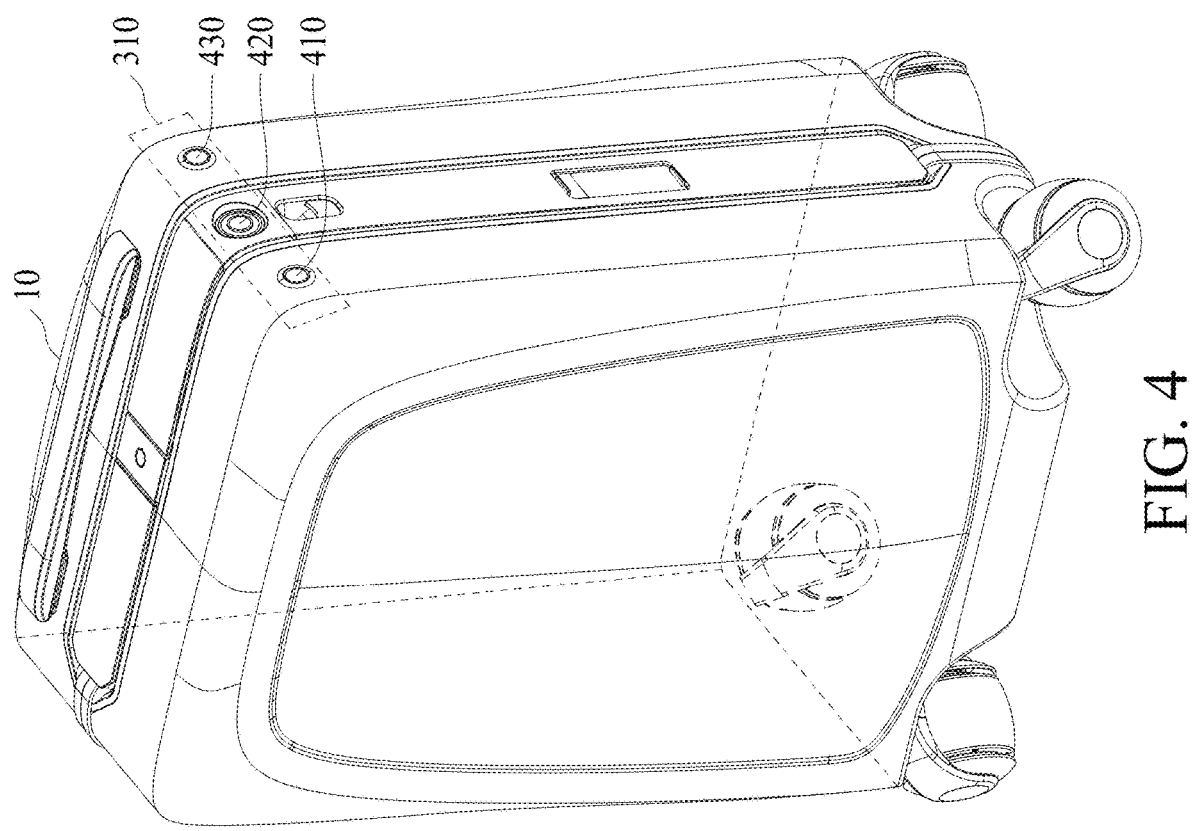
FIG. 4 is a diagram illustrating a location of a sensing device installed on the movable container according to an embodiment of the present disclosure.

More specifically, when the motors 211 to 214 provide the momentums precisely, the movable container 10 is moving and driven by a force $F_{drive}$. In one embodiment, the sensing device 310 includes an accelerometer, and when the movable container 10 is driven by the force $F_{drive}$, the accelerometer detects an acceleration $A_{cc}$ as the motion feature MF. In some embodiments, the accelerometer may be included in an inertial measurement unit. The control circuit 320 can easily calculate the calculated mass MASS_cal according to the motion feature MF (i.e., the acceleration A) and the force $F_{drive}$. In another embodiment, the sensing device 310 includes an image sensor and a timer, and when the movable container 10 is driven by the force $F_{drive}$, the image sensor and the timer sense a moving distance $X_{sense}$ and a length of time $t_{sense}$ for which the movable container 10 is driven by the force $F_{drive}$. According to the moving distance $X_{sense}$ and the length of time $t_{sense}$, the control circuit 320 can calculate the velocity $V_{sense}$. According to the moving distance $X_{sense}$ and the velocity $V_{sense}$, the control circuit 320 can calculate the acceleration $A_{cc}$. According to the force $F_{drive}$ and the acceleration $A_{cc}$, the control circuit 320 can calculate the calculated mass MASS_cal. It should be noted that the generation of the moving distance $X_{sense}$ and the length of time $t_{sense}$ are not limited to be implemented by the image sensor and the timer. Those skilled in the art should readily understand the existence of alternative methods to obtain the moving distance $X_{sense}$ and the length of time $t_{sense}$. For example, the sensing device 310 may include an odometer or wheel speedometer to sense the moving distance $X_{sense}$. FIG. 4 is a diagram illustrating the location of the sensing device 310 installed on the movable container 10 according to an embodiment of the present disclosure. As shown in FIG. 4, the sensing device 310 includes an accelerometer 410, an image sensor 420 and a timer 430. In this embodiment, the image sensor 420 may be a camera for capturing images. It should be noted that the number and the location of the sensors (e.g., the accelerometer 410, the image sensor 420 and the timer 430) are not a limitation of the present disclosure. For example, in this embodiment, the image sensor 420 is installed on the top of a surface (e.g., the front surface of the movable container 10) for easily capturing the images. However, the image sensor 420 might be installed at a different location of the movable container 10 as long as it can easily capture the required images, at the handle or upper part of the pull rods for example.

Figure 5:
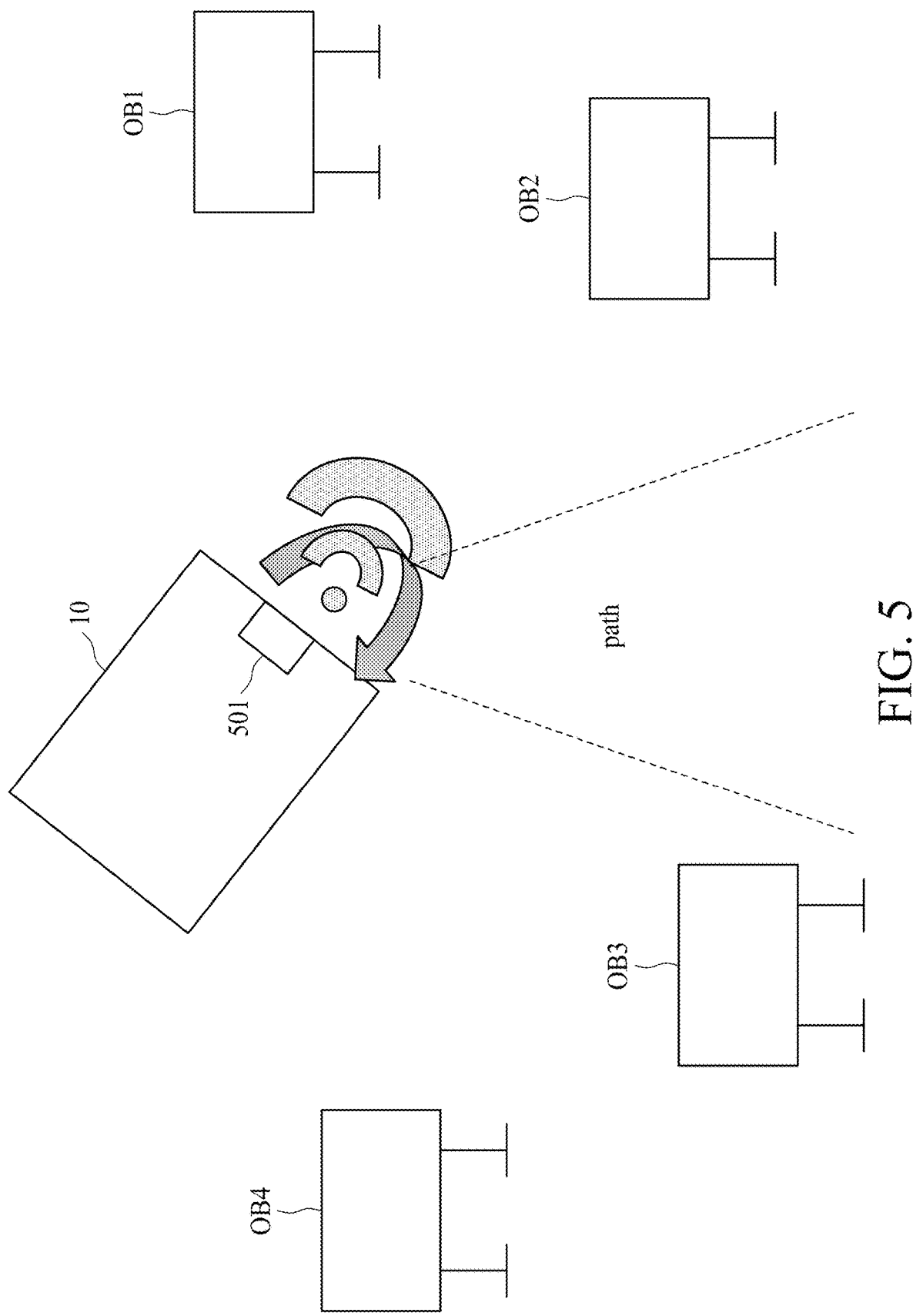
FIG. 5 is a diagram illustrating a sensing device including an ultrasonic sensor and an infrared sensor sensing the obstacles according to an embodiment of the present disclosure.

In some embodiments, the sensing device 310 includes other sensors. For example, the sensing device 310 includes a proximity sensor for sensing and avoiding obstacles. With such configuration, when the user executes the calculation operation, the control circuit 320 can transmit a command to the sensing device 310 to search for a moving path via the ultrasonic sensor or the infrared sensor. The searched moving path allows the movable container 10 to move without encountering any obstacle, and facilitates the control circuit 320 to calculate the calculated mass MASS_cal easily. FIG. 5 is a diagram illustrating the sensing device 310 including the proximity sensor 501 for sensing the obstacles OB1 to OB4 according to an embodiment of the present disclosure. As shown in FIG. 5, the proximity sensor 501 may be installed on the front surface of the movable container 10 to sense the obstacles OB1 to OB4, but the disclosure is not limited thereto. Next, the proximity sensor 501 may find a moving path that includes fewer obstacles to allow the control circuit 320 to calculate the calculated mass MASS_cal. For the calculation of the control circuit 320, the moving path is usually longer than a predetermined value, so the sensing device 310, and more particularly, the image sensor 420 included in the sensing device 310, can easily obtain the moving distance $X_{sense}$. However, the moving path is not limited to a straight line. In other embodiments, the moving path may be a curved line, and the control circuit 320 may calculate the calculated mass MASS_cal according to the angular velocity sensed by the sensing device 310. In this embodiment, the proximity sensor 501 may be an ultrasonic sensor, an infrared sensor, a laser scanner, a light detection and ranging (LiDAR), or a stereo camera. The type of the proximity sensor 501 should not be limited by the present disclosure. In addition, in other embodiments, the proximity sensor 501 may be further arranged to sense the moving distance $X_{sense}$ and calculate the velocity $V_{sense}$. The function of the proximity sensor 501 should not be limited by the present disclosure either.

Figure 6:
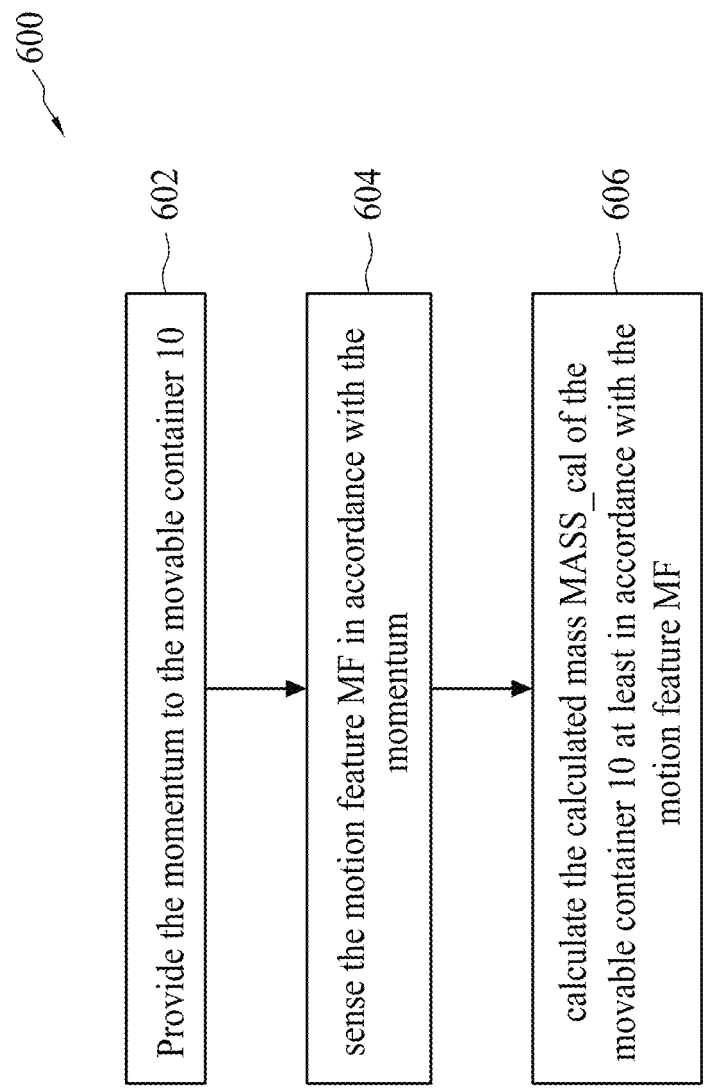
FIG. 6 is a flowchart illustrating the method applied to a movable container according to an embodiment of the present disclosure.

FIG. 6 is a flowchart illustrating the method 600 applied by the movable container 10 according to an embodiment of the present disclosure. Provided that the results are substantially the same, the steps shown in FIG. 6 are not required to be executed in the exact order described, and other orders may be followed. The method 600 is summarized as follows.

In Step 602, momentum is provided to the movable container 10.

In Step 604, the motion feature MF is sensed in accordance with the momentum.

In Step 606, the calculated mass MASS_cal of the movable container 10 is calculated at least in accordance with the motion feature MF.

Those skilled in the art should readily understand the method 600 after reading the paragraphs above. The detailed description is omitted herein for brevity.

It should be noted that, in practice, the momentum provided by the motors 211 to 214 may not be precise under certain circumstances. The force driving the movable container 10 might not be accurate enough, and may introduce a deviation of the calculated mass MASS_cal. Therefore, the control circuit 320 may transmit a setting signal SET to instruct the user to execute a setting operation first to increase the accuracy of calculated mass MASS_cal.

Figure 7:
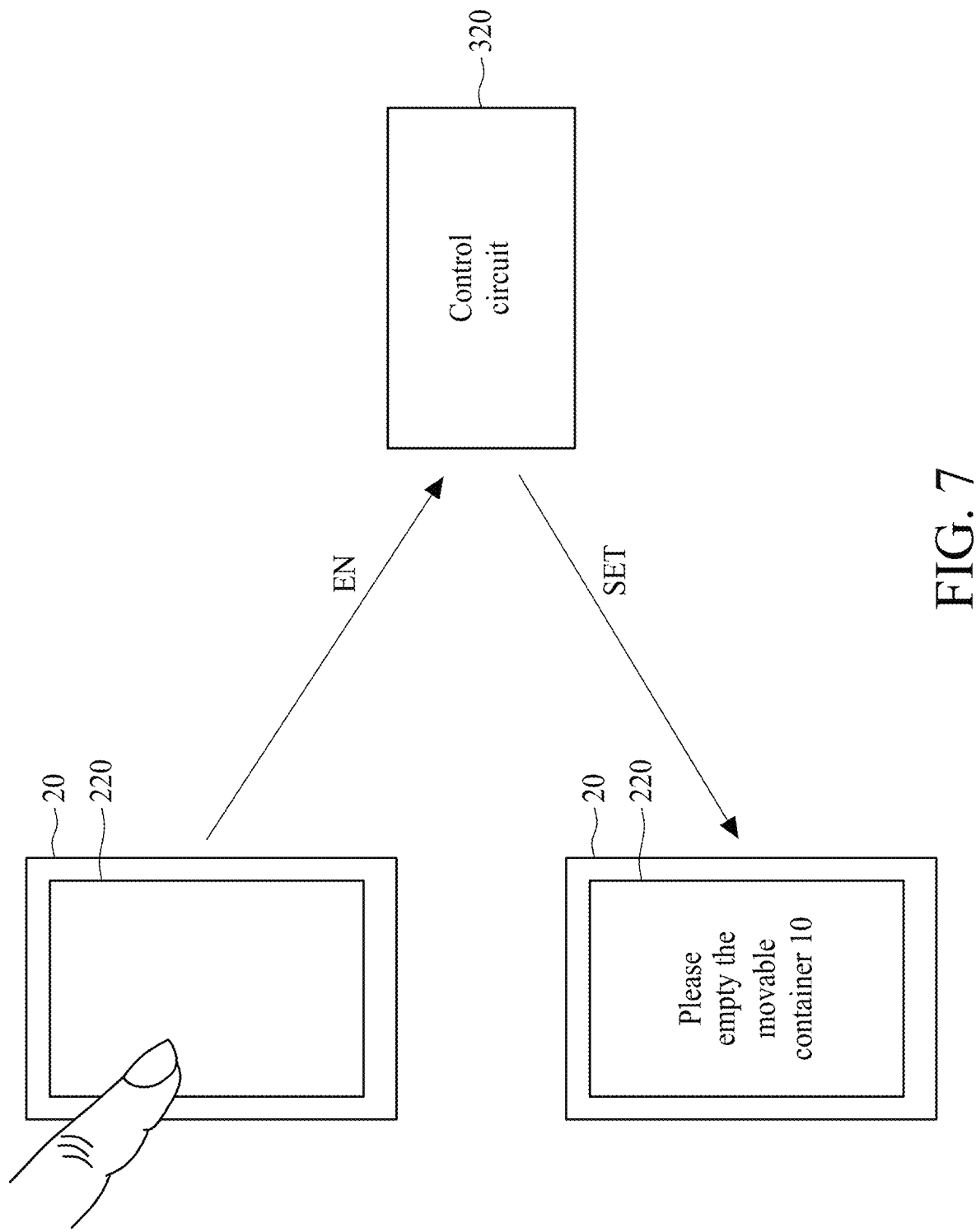
FIG. 7 is a diagram illustrating the steps of executing the setting operation according to an embodiment of the present disclosure.

FIG. 7 is a diagram illustrating the steps of instructing the setting operation according to an embodiment of the present disclosure. When the user issues the user input (in this embodiment, by touching the user interface 220) via the transceiver 210 to activate the calculation operation, the control circuit 320 receives the enable signal EN, and transmits a setting signal SET instructing the user to empty the movable container 10 back to the user interface 220 to inform the user. For example, the setting signal SET might be shown on the screen of the user interface 220.

When the movable container 10 is empty, the user executes the calculation via the user interface 220. As mentioned in the embodiments of FIGS. 3 and 4, the control circuit 320 can calculate a reference mass MASS_ref of the movable container 10 accordingly, wherein the reference mass MASS_ref represents the mass of the empty movable container 10. Next, the user can load the movable container 10 and execute the calculation operation again. At such time, the control circuit 320 may obtain the calculated mass MASS_cal of the loaded movable container 10 based on the equation MASS_ref*$A_{ref}$=MASS_cal*$A_{cc}$, wherein the acceleration $A_{ref}$ and the acceleration $A_{cc}$ can be obtained by the methods mentioned above.

Figure 8:
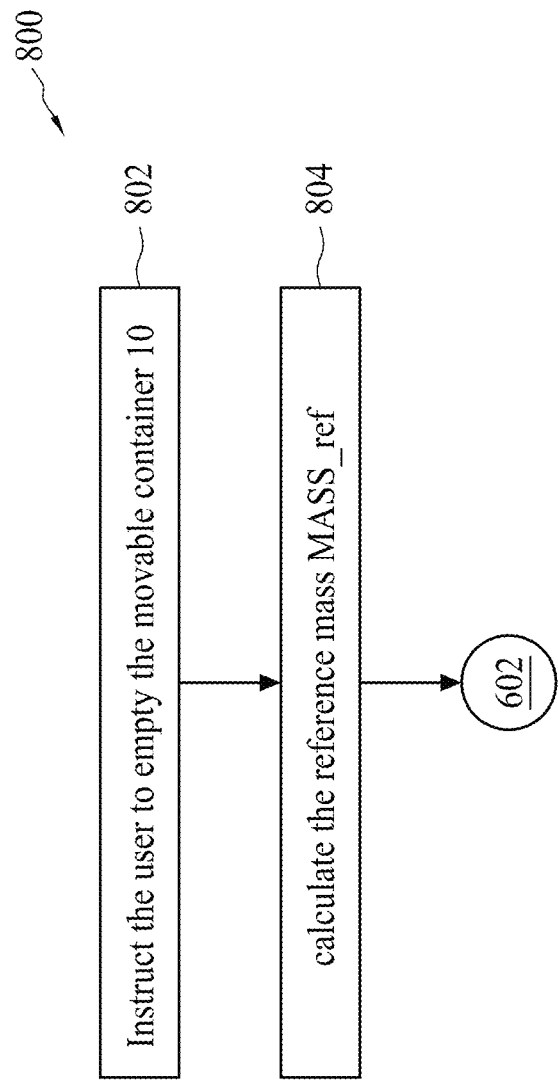
FIG. 8 is a flowchart illustrating execution of the setting operation according to an embodiment of the present disclosure.

FIG. 8 is a flowchart illustrating the setting operation 800 executed prior to the method 600 according to an embodiment of the present disclosure. Provided that the results are substantially the same, the steps shown in FIG. 8 are not required to be executed in the exact order described. The setting operation 800 is summarized as follows.

In Step 802, the user is instructed to empty the movable container 10.

In Step 804, the reference mass MASS_ref is calculated.

Those skilled in the art should readily understand the setting operation 800 after reading the paragraphs above. The detailed description is omitted herein for brevity.

In practice, when the mechanical structures or the electronic structures of the movable container 10 become worn, the deviation of the calculated mass MASS_cal might increase. Therefore, a calibration mechanism is desired for the movable container 10. For example, if the user, by chance, is able to weigh the movable container 10 with an accurate scale such as a scale at the airport to obtain a scaled mass MASS_sca of the movable container 10, the control circuit 320 can instruct the user to execute the calibration operation.

Figure 9:
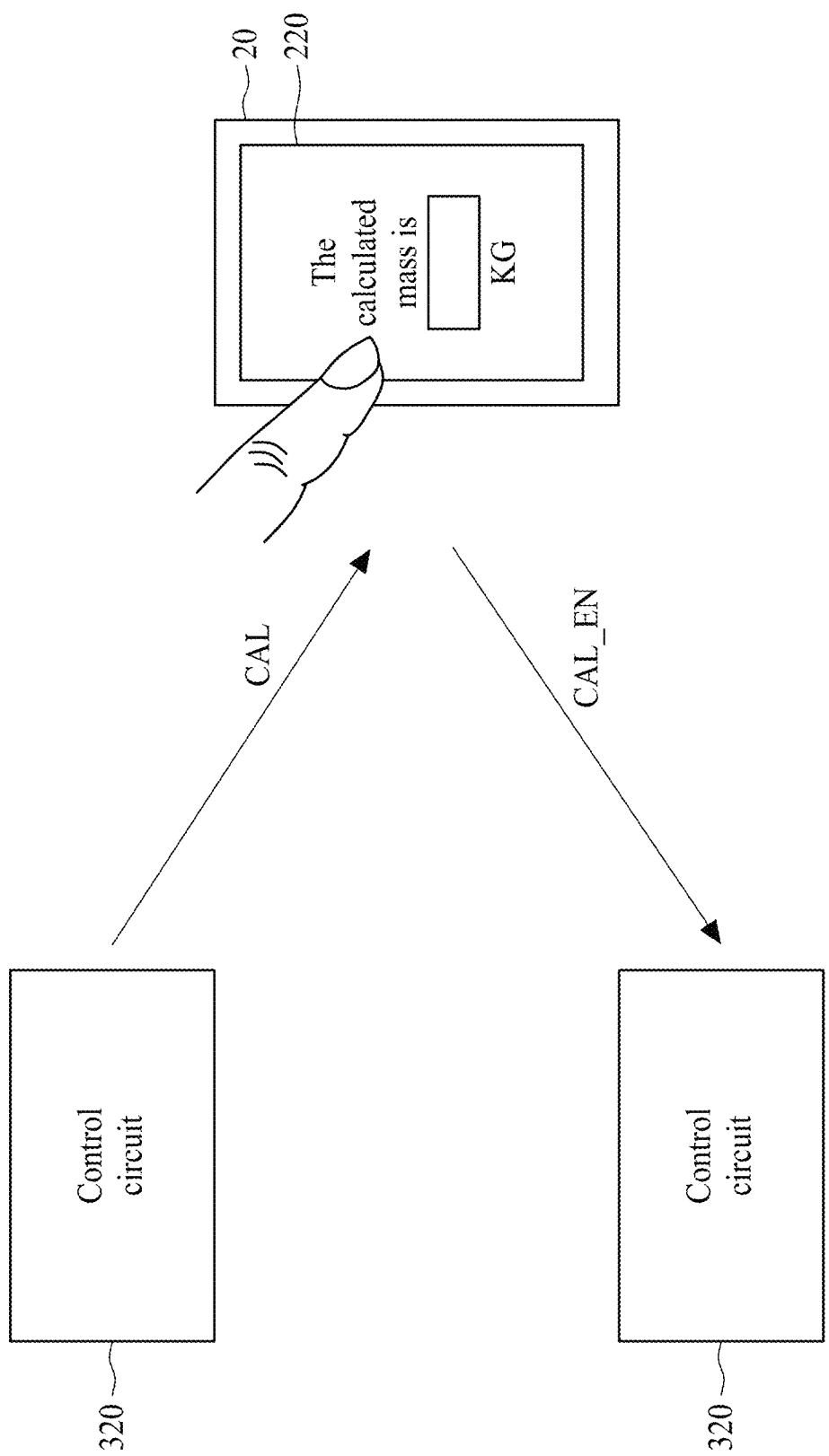
FIG. 9 is a diagram illustrating the steps of executing the calibration operation according to an embodiment of the present disclosure.

FIG. 9 is a diagram illustrating the steps of instructing the calibration operation according to an embodiment of the present disclosure. After the calculated mass MASS_cal is calculated by the method 600, the control circuit 320 transmits a calibration signal CAL to the user interface 220 to instruct the user to execute the calibration operation. For example, the calibration signal CAL may be shown on the screen of the user interface 220 to instruct the user to input the scaled mass MASS_sca via the user input (in this embodiment, by touching the screen of the user interface 220). When the control circuit 320 receives a calibration enable signal CAL_EN converted from the user input via the transceiver circuit 210, the control circuit 320 compares the calculated mass MASS_cal which is calculated before and the scaled mass MASS_sca, and stores the difference of the calculated mass MASS_cal and the scaled mass MASS_sca. Accordingly, when next time the enable signal EN is received by the control circuit 320, the control circuit 320 may refer to the difference of the calculated mass MASS_cal and the scaled mass MASS_sca to generate a calibrated mass MASS_clb, and inform the user of the calibrated mass MASS_clb as the calculated mass MASS_cal. For example, when the original calculated mass MASS_cal is 2 kg heavier than the scaled mass MASS_sca, the control circuit 320 may reduce 2 kg from the original calculated mass MASS_cal as the calibrated mass MASS_clb, and inform the user of the calibrated mass MASS_clb to better provide the exact mass of the movable container 10. Preferably, the control circuit 320 may utilize interpolation method to execute the calibration operation. The method utilized by the control circuit 320 should not be limited by the present disclosure.

Figure 10:
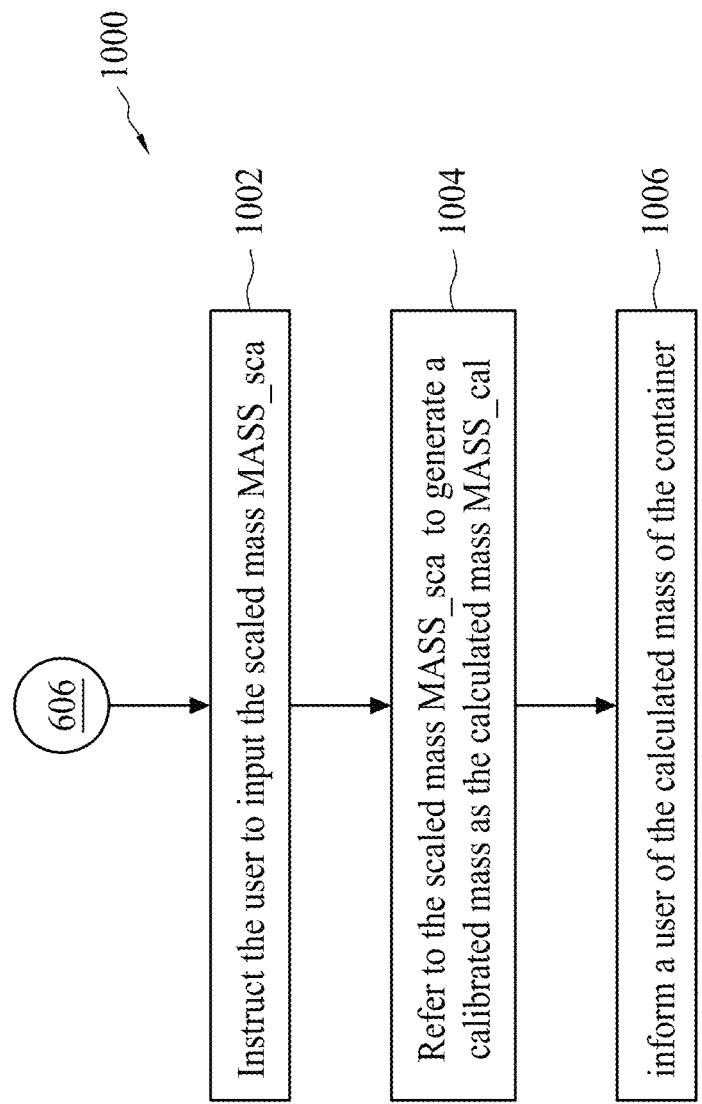
FIG. 10 is a flowchart illustrating execution of the calibration operation according to an embodiment of the present disclosure.

FIG. 10 is a flowchart illustrating the calibration operation 1000 executed after the method 600 according to an embodiment of the present disclosure. Provided that the results are substantially the same, the steps shown in FIG. 10 are not required to be executed in the exact order described. The calibration operation 1000 is summarized as follows.

In Step 1002, the user is instructed to input the scaled mass MASS_sca.

In Step 1004, the scaled mass MASS_sca is referred to generate a calculated mass MASS_clb as the calculated mass MASS_cal are compared.

In Step 1006, the calculated mass MASS_cal of the container is informed to the user.

Those skilled in the art should readily understand the calibration operation 1000 after reading the paragraphs above. The detailed description is omitted herein for brevity.

Figure 11:
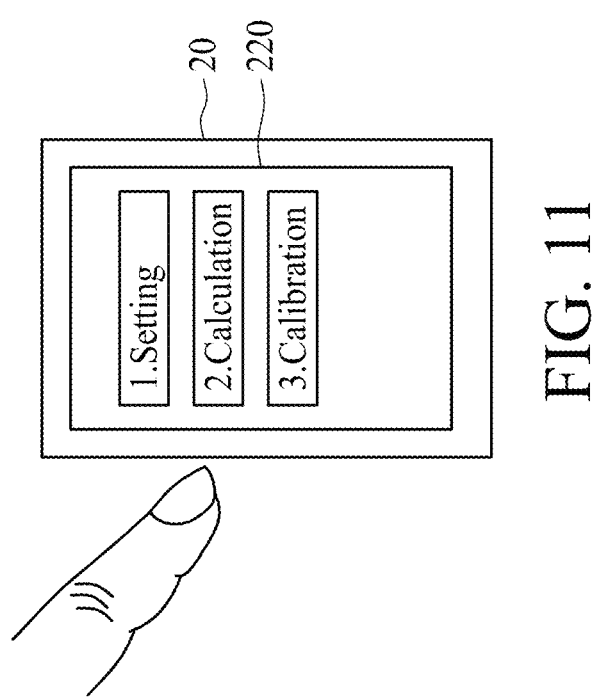
FIG. 11 is a diagram illustrating the user actively executing a setting operation, a calibration operation and a calculation operation via a user interface according to an embodiment of the present disclosure.

It should be noted that, in the abovementioned embodiments, the control circuit 320 instructs the user to execute the setting operation or the calibration operation. However, this is not a limitation of the present disclosure. In some embodiments, the user actively executes the setting operation, the calibration operation or the calculation operation via the user interface 220. FIG. 11 is a diagram illustrating the user actively executing the setting operation, the calibration operation and the calculation operation via the user interface 220 according to an embodiment of the present disclosure. As shown in FIG. 11, the user interface 220 displays options such as setting operation, calibration operation, and calculation operation. Therefore, the user can actively execute the setting operation, the calibration operation, and the calculation operation by touching the screen of the user interface 220.

Figure 12:
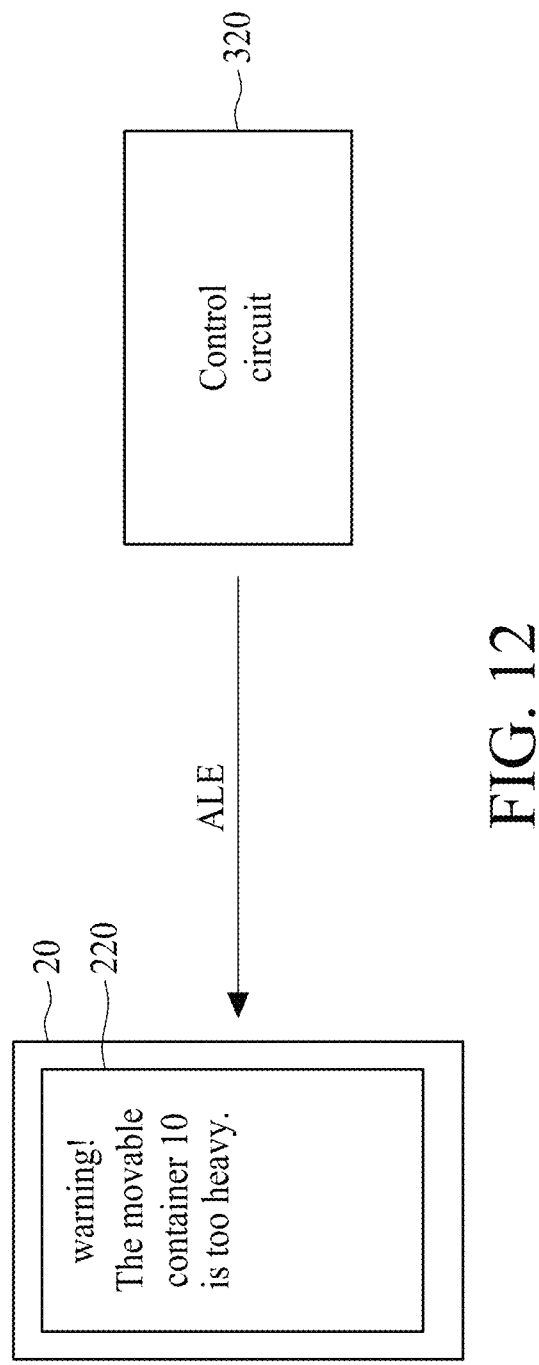
FIG. 12 is a diagram illustrating a control signal provided to the user comprising an alert message according to an embodiment of the present disclosure.

FIG. 12 is a diagram illustrating the control signal providing the user with an alert message according to an embodiment of the present disclosure. In this embodiment, when the calculated mass MASS_cal calculated by the control circuit 320 is greater than a predetermined value, the control circuit 320 transmits the alert message ALE to inform the user that the movable container 10 is too heavy. For example, the alert message may be shown on the screen of the user interface 220 to inform the user.

FIG. 13 is a diagram illustrating the control signal providing the user with an alert message according to another embodiment of the present disclosure. In this embodiment, when the control circuit 320 learns that an amount of charge in the battery is lower than a predetermined value, the control circuit 320 transmits the alert message ALE to inform the user that the battery 215 needs to be charged or replaced. For example, the alert message may be shown on the screen of the user interface 220 to inform the user.

In some embodiments, a movable container is disclosed. The movable container includes: a driving mechanism, a sensing device, and a control circuit. The driving mechanism is arranged to provide a momentum to the movable container. The sensing device is arranged to sense a motion feature in accordance with the momentum provided by the driving mechanism. The control circuit is coupled to the sensing device and the driving mechanism and arranged to calculate a calculated mass of the movable container in accordance with the motion feature sensed by the sensing device, and the control circuit is coordinated with the driving mechanism and the sensing device via a user input.

In some embodiments, an electronic device is disclosed. The electronic device includes: a transceiver circuit, and a user interface. The transceiver circuit is arranged to transmit and receive signals from a movable container. The user interface is arranged to receive the user input and inform a user of the electronic device of the calculated mass of the container. When the user input indicates a calculation operation, the transceiver circuit transmits a command to activate the driving mechanism of the movable container to provide the momentum for calculating the calculated mass of the container.

In some embodiments, a method of a movable container is disclosed. The method includes: providing a momentum to the movable container sensing a motion feature in accordance with the momentum; and calculating a calculated mass of the movable container at least in accordance with the motion feature.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of a movable container, comprising:
   receiving a user input instructing a calculation operation via an electronic device;
   activating a driving mechanism of the movable container with a trigger of the user input to provide a momentum to the movable container;
   sensing a motion feature in accordance with the momentum;
   calculating a calculated mass of the movable container at least in accordance with the motion feature; and
   instructing the user to input a scaled mass of the container via the electronic device to execute a calibration operation.

2. The method of claim 1, further comprising:
informing a user of the calculated mass of the container via the electronic device.

3. The method of claim 1, wherein the calibration operation comprises:
referring to the scaled mass to generate a calibrated mass as the calculated mass; and
informing a user of the calculated mass of the container.

4. The method of claim 1, further comprising:
rotating the container to find a moving path, wherein a length of the moving path is greater than a predetermined value;
wherein rotating the container to find the moving path comprising:
utilizing a proximity sensor to find the moving path.

5. The method of claim 1, wherein the movable container comprises a battery, and the method further comprises:
providing the user with an alert message when the calculated mass of the container is greater than a predetermined value.

6. The method of claim 1, wherein the momentum is provided by a driving current.

7. A method of a movable container, comprising:
receiving a user input instructing a calculation operation via an electronic device;
activating a driving mechanism of the movable container with a trigger of the user input to provide a momentum to the movable container;
sensing a motion feature in accordance with the momentum;
calculating a calculated mass of the movable container at least in accordance with the motion feature; and
instructing the user to execute a setting operation via the electronic device before the calculated mass of the container is calculated.

8. The method of claim 7, wherein the setting operation comprises:
calculating a reference mass of the container when the container is empty;
and steps of calculating the calculated mass of the movable container comprise:
calculating the calculated mass of the movable container by referring to the reference mass of the container.

* * * * *